(No Model.)

C. E. ATKINSON.
CULTIVATOR.

No. 397,484. Patented Feb. 12, 1889.

Witnesses,

Inventor,
C. E. Atkinson

UNITED STATES PATENT OFFICE.

CHARLES E. ATKINSON, OF PENNSVILLE, NEW JERSEY.

CULTIVATOR.

SPECIFICATION forming part of Letters Patent No. 397,484, dated February 12, 1889.

Application filed November 2, 1888. Serial No. 289,802. (No model.)

*To all whom it may concern:*

Be it known that I, CHARLES E. ATKINSON, a resident of Pennsville, in the county of Salem and State of New Jersey, have invented certain new and useful Improvements in Cultivators; and I do hereby declare the following to be a full, clear, and exact description of the invention, such as will enable others skilled in the art to which it pertains to make and use the same.

My invention relates to an improvement in cultivators; and it consists in the peculiar construction and combination of devices, that will be more fully set forth hereinafter, and particularly pointed out in the claims.

Figure 1:
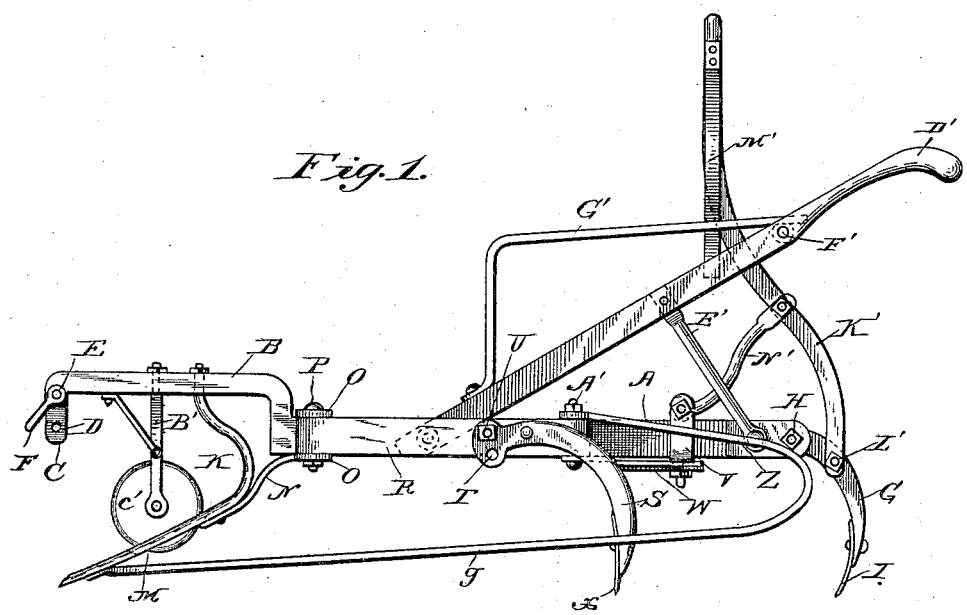
Figure 2:
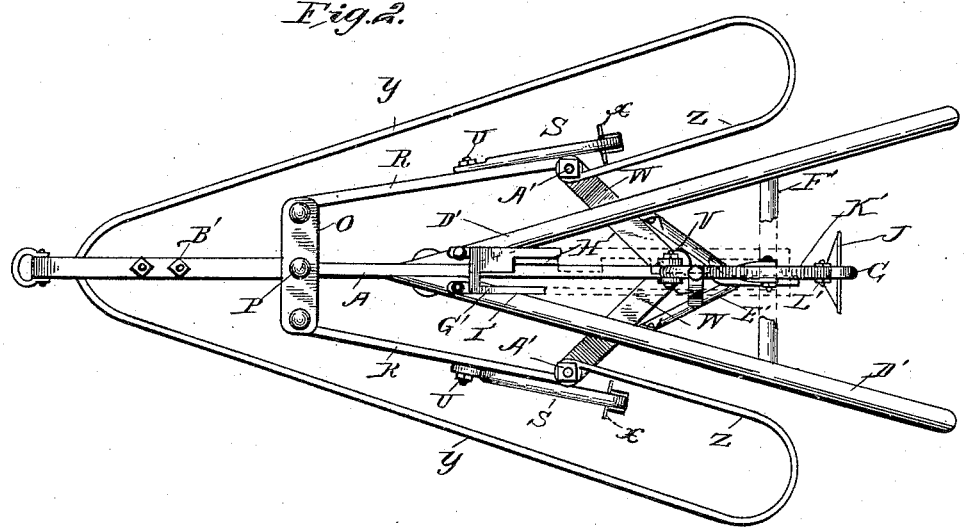
Figure 3:
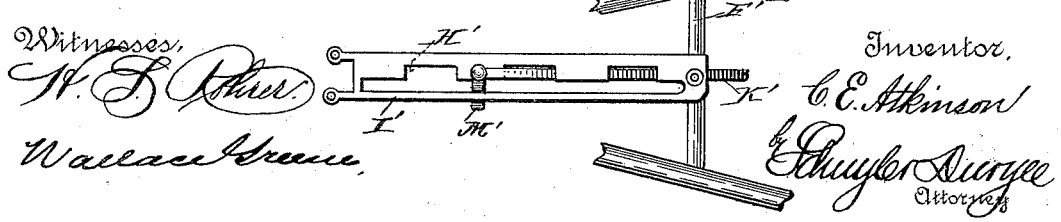

In the drawings hereto annexed, Figure 1 is a side elevation of a cultivator embodying my improvements. Fig. 2 is a top plan view of the same, parts being broken away and indicated in dotted lines. Fig. 3 is a detail view.

A represents the beam, which has a horizontal arm, B, projecting forward from its front end. The front end of said arm is bent downward, as at C, and is provided with adjusting-openings D for the pivotal bolts E of a clevis, F. To the rear end of the beam is attached a standard, G, by a pivotal bolt, H, and to said standard is secured a plow or shovel, I, of suitable combination.

K represents a curved downward-extending inclined arm or colter, that has its upper end bolted to the arm B and has a longitudinal slot, M. A brace-rod, N, is bolted to the under side of the arm or colter, and has its rear end arranged under the front end of the beam. On the upper and lower sides of the latter are transverse plates or arms O, secured thereto by a central bolt, P, which also secures the rear end of the brace-rod N. Between the outer ends of the arm O are pivotally bolted the front ends of laterally-adjustable beams R, that are arranged on opposite sides of beam A.

S represents standards pivoted to the outer sides of the beams R, near the rear ends thereof, and having adjusting-opening T arranged concentrically with their pivots. Bolts V engage said adjusting-opening and secure the standards to the beams at any desired adjustment, as will be readily understood.

V represents a clip that slides on the beam A, and is pivotally connected to the rear ends of the beams R by links W, said clip and links being thereby adapted to move the rear ends of the beams R toward and from each other by moving the clip forward or back on the beam A, and thereby enabling the cultivator to be adjusted to any desired width of space between the rows of plants.

Each standard S has a suitable shovel or plow, X.

Y represents fenders, which are formed from rods of suitable length and diameter, bent as shown, and provided with inward-extending arms Z at their rear ends, which are secured on the rear ends of the beams R by the pivotal bolts A', that connect the links W thereto. The front ends of the fender-rods are pivotally bolted to the under side of the colter-arm L, and thereby the fenders are adjustable laterally with the beams R, as is obvious. The functions of the fenders is to prevent the growing plants from being covered or bruised by clods or trash.

A standard, B', is bolted to and depends from the arm B, and has journaled at its lower bifurcated end a circular cutter or wheel, C', the peripheral edge of which is sharpened and extends through the slot M of the colter-arm. The function of this wheel or cutter is to cut weeds, vines, stalks, or trash that sweep rearward over the colter-arm, and thereby prevent the cultivator from pulling out or uprooting plants, or from becoming choked or fouled.

It will be understood that the friction of the weeds, vines, and stalks on the cutter or wheel causes the latter to revolve when the cultivator is in operation. The sides of the slot M scrape the cutter or wheel and keep the same clean at all times.

D' represents the handles, which are similar to plow-handles, are bolted to the beam A, and supported by braces E', of ordinary construction. Secured on said handles and on the cross-bar F' thereof is a frame, G', that has a notched plate, H', and a parallel rod, I', adjacent to the notched edge thereof.

A lever, K', is pivoted to the standard G by a bolt, L', and the upper portion of the lever is adapted to engage the notched plate arranged between the same and the parallel guide-rod. A spring, M', is secured to the said lever and bears laterally against the inner side of the guide-rod, and thereby serves to secure the lever to the notched plate at any desired adjustment. A link, N', connects the lever to the sliding clip, and hence adapts the lever to operate the clip and thereby laterally adjust the beams R, as before stated.

It will be understood from the foregoing description and by reference to the drawings that by tightening the nut on bolt $N^2$, which connects the clip to the link, the clip will be secured against movement on the beam, and the lever may then be operated to adjust the standard G and cause the plow or shovel I to operate at any desired depth. By loosening the nut on bolt $N^2$ and tightening the nut on bolt H, the clip will be free to move and the standard G rigidly secured to the beam, and the movement of the lever will then cause the clip to move forward or back to adjust the beams R laterally to any distance required.

A cultivator thus constructed is cheap and simple, is very strong and durable, and will be found very efficient.

Having thus described my invention, I claim—

1. In a cultivator, the combination of the beam A, the beams R on opposite sides thereof and having their front ends pivotally connected thereto, the clip movable longitudinally on beam A, the links connecting the clip to the rear ends of beams R, the standard G, the clamping-bolt H, pivoting said standard to the beam A, the lever K', pivoted to said standard, the link connected to said lever, and the pivotal clamp-bolt connecting said link to the clip, all arranged and adapted to operate substantially as described.

2. In a cultivator, the combination, with the central beam having the horizontal arm B projecting from its front end, of the inclined colter-arm K, having its upper end bolted to arm B, the standard B', bolted to and depending from the arm B, the circular cutter-wheel journaled at the lower end of the standard, and having its lower edge extending through a slot, M, in the colter-arm, the laterally-adjustable beams R, having their front ends pivoted to the beam A, and the fender-rods having their rear ends pivotally connected to the beams R and their front ends pivoted to the arm K, substantially as described.

In testimony whereof I have signed this specification in the presence of two subscribing witnesses.

CHARLES E. ATKINSON.

Witnesses:
JAMES HIGGINS,
A. E. HEWES.